United States Patent [19]
Nakamura

[11] Patent Number: 4,942,508
[45] Date of Patent: Jul. 17, 1990

[54] SWITCHING REGULATOR

[75] Inventor: Shigeo Nakamura, Yamanashi, Japan

[73] Assignee: Fanuc Ltd, Minamitsuru, Japan

[21] Appl. No.: 363,515

[22] PCT Filed: Oct. 18, 1988

[86] PCT No.: PCT/JP88/01059

§ 371 Date: May 30, 1989

§ 102(e) Date: May 30, 1989

[87] PCT Pub. No.: WO89/04083

PCT Pub. Date: May 5, 1989

[30] Foreign Application Priority Data

Oct. 29, 1987 [JP] Japan ............... 62-274404

[51] Int. Cl.⁵ .................. H02M 3/338; H02M 3/28
[52] U.S. Cl. .................. 363/19; 363/97; 323/289
[58] Field of Search ............ 363/18, 19, 95, 97; 323/902, 289

[56] References Cited
U.S. PATENT DOCUMENTS 3,889,173  6/1975  Klusmann et al. .
4,758,937  7/1988  Usui et al. .................. 363/19
4,763,235  8/1988  Morita .................... 363/19

OTHER PUBLICATIONS

Patent Abstracts of Japan, vol. 6, No. 140 (E-121) [1018], Jul. 29, 1982; & JP-A-57 62 774 (Tokyo Shibaura Denki K.K), 15-04-82.

Primary Examiner—Peter S. Wong
Attorney, Agent, or Firm—Staas & Halsey

[57] ABSTRACT

A switching regulator for controlling an output voltage by a pulse width of a switching element such as a transistor and the like at a primary side of the switching regulator. The switching regulator is provided with a feedback element which converts an output voltage at a secondary side into a feedback current, and controls an amount of charge of a capacitor (C3) to control a time for which the transistor (Q1) is kept on at the primary side and an amount of charge of a speed-up capacitor (C2) at the primary side. When a small load is imposed, an excessive increase in the output voltage can be prevented by controlling an amount of charge on the capacitor (3) to control the keeping-on-time and an amount of charge of the speed-up capacitor (C2) at the primary side. This also shortens the time for which the transistor (Q1) at the primary side is kept on.

3 Claims, 3 Drawing Sheets

SWITCHING REGULATOR

BACKGROUND OF THE INVENTION

The present invention relates to an improvement of a switching regulator used as a power supply for industrial electronic devices and the like.

A switching regulator is widely used as a power supply for industrial electronic devices and the like for converting a DC voltage into high-frequency pulses, converting the high-frequency pulses into a DC voltage by rectifying and smoothing same, and feeding back an output voltage to control the pulse width of the high-frequency pulses.

FIG. 2 shows an example of this switching regulator, wherein Vi designates an input voltage to the switching regulator, and a snubber circuit for a transistor Q1 is composed of a resistor R1, a capacitor C1, and a diode D1. The transistor Q1 and a transistor Q2 form an oscillation circuit using windings W1 and W2 of a transformer T as feedback loops, and an output voltage is determined by a pulse width of the transistor Q1.

In FIG. 2, C2 designates a speed up capacitor for turning the transistor Q1 on and off, and D2 designates a diode for checking a reverse direction. A resistor R2 supplies a base current to the transistor Q1 at the start of oscillation thereof, and resistors R3 and R4 are coupled at one end in series with the speed up capacitor C2 and at the other end with the winding W2. A capacitor C3 is coupled with a base of the transistor Q2 and is charged and discharged to turn the transistor Q2 on and off, and simultaneously, to turn the transistor Q1 on and off, whereby the output voltage is controlled. The capacitor C3 is charged through three routes, i.e., through a resistor R5 and a diode D3, through a resistor R6, a zener diode ZD and a diode D4, and through the resistor R4, a diode D6 and a photo coupler PC1, and discharged through the resistor R6, the zener diode ZD, a diode D5, and a resistor R7.

In the FIG. 2, $D_O$ designates a diode at an output side, $C_O$ designates a smoothing capacitor at the output side, $R_O$ designates a dummy resistor, and a DC voltage $V_O$ is applied to an output terminal.

The photo coupler PC1 feeds back the output voltage through the diode D6 to control a charge current to the capacitor C3. A shunt regulator SR acts as an operational amplifier and contains a reference voltage source, and when a feedback loop is balanced by the operation of the shunt regulator SR, the output voltage $V_O$ is determined as follows.

$$V_O = V_s[(R11+R12)/R12]$$

where $V_s$ is a reference voltage of the shunt regulator SR.

When the output voltage $V_O$ is increased, a current to a resistor R8 and the photo coupler PC1 is increased, a collector current of the photo coupler PC1 is increased, a charge current to the capacitor C3 is increased, and a timing for turning on the transistor Q2 is accelerated. As a result, a time for which the transistor Q1 is kept on is shortened, and the output voltage is decreased. With this arrangement, the output voltage is maintained at a predetermined value. A resistor R9 by-passes a leak current from the shunt regulator SR when a current is not supplied to the photo coupler PC1, and a capacitor C4 and a resistor R10 form an AC gain stabilizing circuit.

The capacitor C3 for setting a keeping-on-time is charged by the output from the photo coupler PC1 to set a keeping-off-time of the transistor Q2, i.e., a time for which the transistor Q1 is kept on is controlled by the voltage charged in the capacitor C3. Since, however, a certain amount of the voltage in the capacitor C3 is always discharged when the transistor Q1 is kept off, a time for which the transistor Q1 is kept on unavoidably corresponds to the amount of voltage discharged.

Further, since the current from the speed-up capacitor C2 is not completely absorbed by the transistor Q2 while turned on, the excess currentflows into the base of transistor Q1 and turns the transistor Q1 on. This is also a reason why the time for which the transistor Q1 is kept on can not be less than a predetermined time.

Therefore, even when an attempt is made to set the keeping on time to a value smaller than a minimum keeping on time, when a load is too small, this value cannot be obtained, and thus the output voltage is unwantedly high. FIG. 3 is an example of this case, wherein the horizontal axis represents an output current $I_O$ and the vertical axis represents an output voltage $V_O$. The output characteristic is represented by curve L, and shows that a voltage is greatly increases when a small load is imposed. To prevent this increase in the voltage, the dummy resistor $R_O$ is provided in the output circuit of FIG. 2. As a result, problems such as a reduction of efficiency due to a current consumed by the dummy resistor, heat generation and the like constantly occur.

SUMMARY OF THE INVENTION

An object of the present invention is to solve the above problems and to provide an improved switching regulator for preventing an increase in an output voltage even if a small load is imposed.

To solve the above problems, according to the present invention, there is provided a switching regulator for controlling an output voltage by a pulse width of a switching element such as a transistor and the like at a primary side, comprising a feedback element for converting an output voltage at a secondary side into a feedback current, and controlling an amount of charge of a capacitor to control a time for which the transistor at the primary side is kept on and an amount of charge of a speed up capacitor at the primary side.

A keeping-on-time of the transistor at the primary side is shortened by controlling an amount of charge of the capacitor for controlling the keeping-on-time and an amount of charge of the speed-up capacitor.

DESCRIPTION OF THE PREFERRED EMBODIMENT

Figure 1:
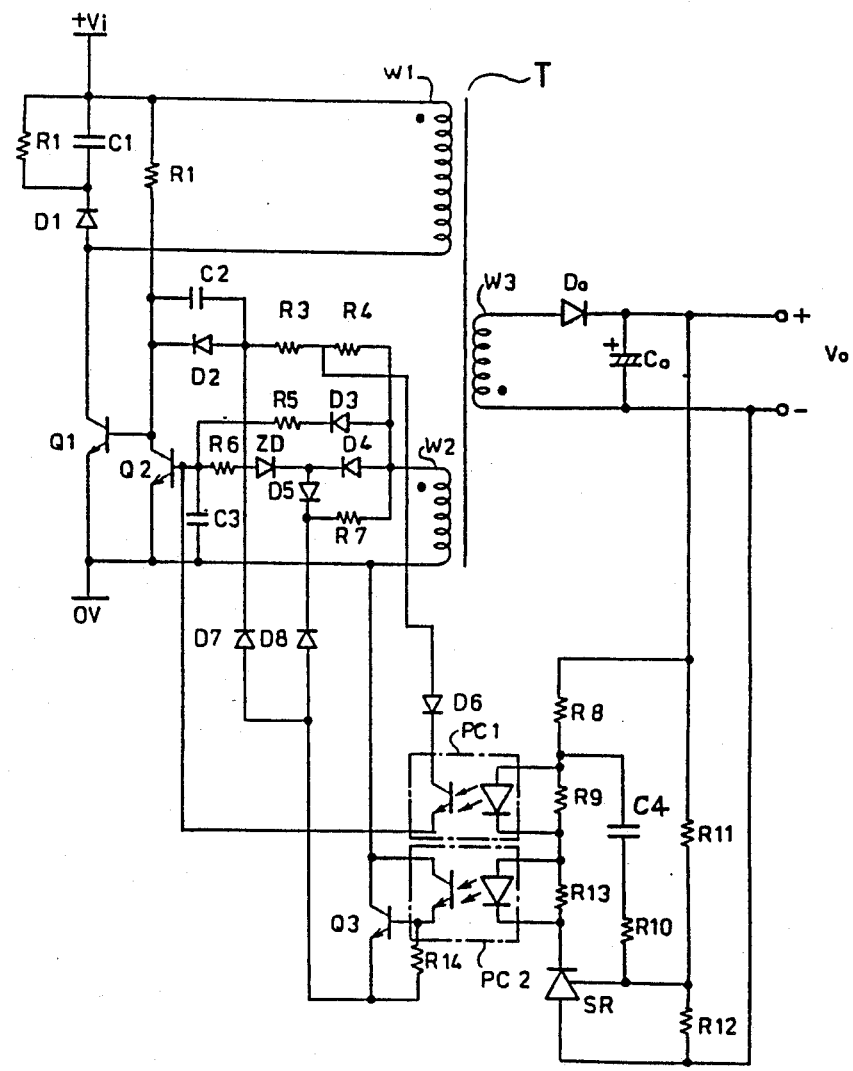
FIG. 1 is a circuit diagram of a switching regulator of an embodiment according to the present invention.

An embodiment of the present invention will be hereinafter described with reference to the drawing.

FIG. 1 is a circuit diagram of an embodiment of a switching regulator according to the present invention, wherein Vi designates an input voltage, and a snubber circuit for a transistor Q1 is composed of a resistor R1, a capacitor C1, and a diode D1. The transistor Q1 and a transistor Q2 form an oscillation circuit using windings W1 and W2 of a transformer T as feedback loops, and an output voltage is determined by a pulse width of the transistor Q1.

In FIG. 1, C2 designates a speed-up capacitor for turning the transistor Q1 on and off, and D2 designates a diode for checking a reverse direction. A resistor R2 supplies a base current to the transistor Q1 at the start of oscillation thereof, and resistors R3 and R4 are coupled at one end in series with the speedup capacitor C2 and at the other end with the winding W2. A capacitor C3 is coupled with a base of the transistor Q2 and is charged and discharged to turn the transistor Q2 on and off, and simultaneously, to turn the transistor Q1 on and off, whereby the output voltage is controlled. The capacitor C3 is charged through three routes, i.e., through a resistor R5 and a diode D3, through a resistor R6, a zener diode ZD and a diode D4, and through, the resistor R4, a diode D6 and a photo coupler PC1. The capacitor is discharged through the resistor R6, the zener diode ZD, a diode D5, and a resistor R7.

In FIG. 1, $D_O$ designates a diode at an output side, $C_O$ designates a smoothing capacitor at the output side, and a DC voltage $V_O$ is applied to an output terminal.

The photo coupler PC1 feeds back the output voltage through the diode D6 to control a charge current to the capacitor C3. A shunt regulator SR acts as an operational amplifier and contains a reference voltage source, and when a feedback loop is balanced by the operation of the shunt regulator SR, the output voltage $V_O$ is determined as follows.

$$V_O = V_s[(R11+R12)/R12]$$

where $V_s$ is a reference voltage of the shunt regulator SR.

When the output voltage $V_O$ is increased, a current to a resistor R8 and the photo coupler PC1 is increased, a collector current of the photo coupler PC1 is increased, a charge current to the capacitor C3 is increased, and a timing for turning on the transistor Q2 is accelerated. As a result, a time for which the transistor Q1 is kept on is shortened, and the output voltage is decreased. With this arrangement, the output voltage is maintained at a predetermined value. A resistor R9 by-passes a leak current from the shunt regulator SR when a current is not supplied to the photo coupler PC1, and a capacitor C4 and a resistor R10 form an AC gain stabilizing circuit.

Further, PC2 designates a photo coupler coupled in such a manner that, when the output voltage becomes higher than a normal control range, a current flowing through the photo coupler PC2 is amplified by a transistor Q3 and a resistor R14 and supplied to diodes D7 and D8 when a current flowing through the shunt regulator SR is greater than a value which can be by-passed by a by-pass resistor R13 of the photo coupler PC2.

The diode D8 shortens the time for which the transistor Q1 is kept on by applying a current from the transistor Q3 and the photo coupler PC2 to the resistor R7, suppressing a discharge current from the capacitor C3, and accelerating a timing at which the transistor Q2 is turned on.

The diode D7 reduces a keeping-on-time of the transistor Q1 by applying the current from the photo coupler PC2 to the resistors R3 and R4, reducing an amount of discharge of the capacitor C2, and reducing a base current of the transistor Q1 when turned on to decrease a storage time thereof.

Although the photo coupler is used to feed back the output voltage in the above description, another element, e.g., a photo diode or the like, may be used.

Figure 2:
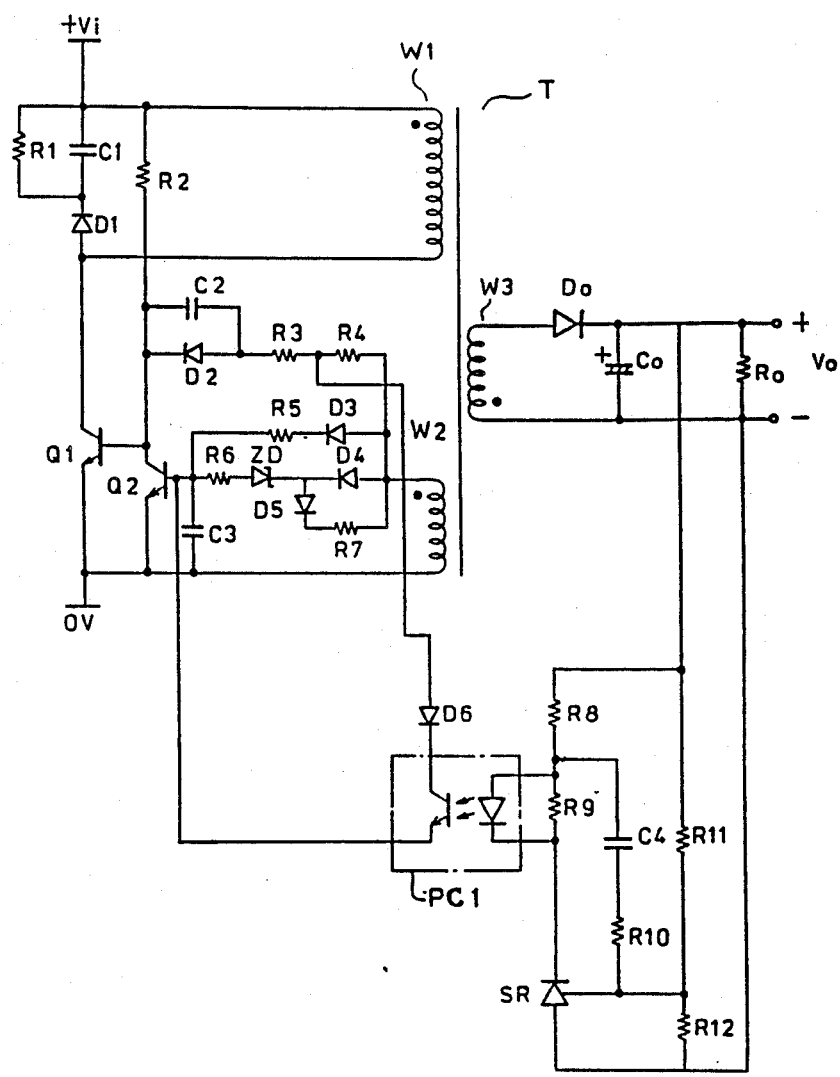
FIG. 2 is a circuit diagram of a conventional switching regulator.
Figure 3:
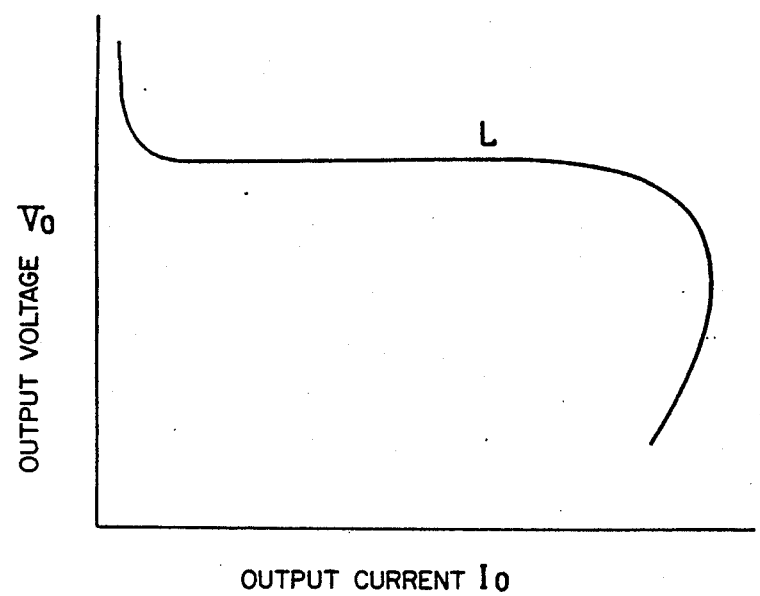
FIG. 3 is an output characteristic of a conventional switching regulator.

With the above arrangement, when a small load is imposed, an excessive increase in the output voltage is prevented by shortening the time for which the transistor Q1 is kept on through use of the feedback current of the photo coupler PC2. Therefore, the dummy resistor $R_O$ shown in FIG. 2 can be omitted, and thus the efficiency of a power supply is increased and problems such as heat generation and the like are solved.

As described above, according to the present invention, a time for which a transistor at a primary side is kept on is appropriately shortened when a small load is imposed. The use of a dummy resistor becomes unnecessary, the efficiency of a power supply is increased, problems such as heat generation and the like are solved, and reliability of the device is improved.

I claim:

1. A switching regulator for controlling an output voltage by using a pulse width of a switching element such as a translator at a primary side of the switching regulator, comprising:
   a speed-up capacitor located at the primary side of the switching regulator;
   a capacitor operatively connected to the transistor;
   a first feedback element, operatively connected to said capacitor and the transistor, for converting an output voltage at a secondary side into a feedback current, for controlling an amount of charge on said capacitor to control a time for which the transistor at the primary side is kept on, and for controlling an amount of charge of said speed-up capacitor; and
   a second feedback element, operatively connected to said speed-up capacitor and said capacitor, for suppressing a discharge current from said speed-up capacitor and said capacitor and decreasing on-time of the transistor to decrease the output voltage when the output voltage is high.

2. A switching regular according to claim 1, wherein said feedback element comprises a photocoupler.

3. A switching regulator, comprising:
   a snubber circuit;
   a first transistor having a collector, having a base operatively connected to said snubber circuit, and having an emitter;
   a second transistor having a collector connected to the base of said first transistor, having an emitter connected to the emitter of said first transistor, and having a base;
   a speed-up capacitor operatively connected to said snubber circuit and said second transistor;
   a capacitor, operatively connected to said base of said second transistor, for turning on and off said first and second transistors and controlling an output voltage of the switching regulator;
   a first resistor operatively connected to the base of said second transistor and to said capacitor;
   a zener diode connected in series with said first resistor;
   a first diode operatively connected to said zener diode;
   a second resistor operatively connected to a connection of said base of said second transistor, said second capacitor and said first resistor;
a second diode operatively connected in series with said second resistor and connected to said first diode;
a third resistor operatively connected to said speed-up capacitor;
a third diode operatively connected to said third resistor;
first photocoupler means, operatively connected between said third diode and the base of said second transistor, for feeding back an output voltage through said third diode for controlling a charge current to said capacitor;
second photocoupler means, operatively connected to said speed-up capacitor, for suppressing a discharge current from said capacitor and accelerating a timing for turning on said second transistor;
a third transistor having a base operatively connected to said second photocoupler means, having a collector connected to said second photocoupler means and to said capacitor, and having an emitter;
a fourth diode operatively connected between said zener diode and the emitter of said third transistor, a connection node formed between said fourth diode and the emitter of said third transistor; and
a fifth diode connected between said speed-up capacitor and the connection node formed between said fourth diode and the emitter of said third transistor.

* * * * *